United States Patent [19]

Figueira et al.

[11] Patent Number: 4,630,722
[45] Date of Patent: Dec. 23, 1986

[54] ELECTROMAGNETIC WRAP SPRING CLUTCH

[75] Inventors: Stephen Figueira, Penfield; Philip A. Billings, Fairport, both of N.Y.

[73] Assignee: Xerox Corporation, Stamford, Conn.

[21] Appl. No.: 445,332

[22] Filed: Nov. 29, 1982

[51] Int. Cl.$^4$ .................. F16D 13/08; F16D 27/10
[52] U.S. Cl. .................. 192/84 T; 192/81 C
[58] Field of Search .................. 192/81 C, 84 T; 188/77 W

[56] References Cited

U.S. PATENT DOCUMENTS

| | | | |
|---|---|---|---|
| 1,760,223 | 5/1930 | Wittkuhns | 192/84 T |
| 3,128,863 | 4/1964 | Tomko | 192/81 C |
| 3,149,705 | 9/1964 | Shoquist | 192/81 C |
| 3,149,706 | 9/1964 | Mason et al. | 192/81 C |
| 3,177,996 | 4/1965 | Bates | 192/84 T X |
| 3,185,276 | 5/1965 | Sajover, Jr. | 192/81 C |
| 3,216,392 | 11/1965 | Shimanckas | 192/84 T X |
| 3,349,880 | 10/1967 | Baer | 192/84 T |
| 3,491,866 | 1/1970 | Birdsall | 192/84 T |
| 3,528,533 | 9/1970 | Sacchini | 192/81 C X |
| 3,637,056 | 1/1972 | Baer | 192/84 T |
| 3,685,622 | 8/1972 | Baer et al. | 192/81 C X |
| 3,905,458 | 9/1975 | Mehrbrodt | 192/26 |
| 3,934,690 | 1/1976 | Janning | 192/84 T |
| 3,974,902 | 8/1976 | Wahlstedt et al. | 192/84 T |
| 4,030,584 | 6/1977 | Lowery et al. | 192/84 T |
| 4,257,497 | 3/1981 | Schroeder | 192/84 T X |
| 4,321,992 | 3/1982 | Gallo | 192/84 T X |
| 4,326,612 | 4/1982 | Houlberg | 192/84 T X |
| 3,6685,622 | 8/1972 | Baer et al. | 192/81 C X |

FOREIGN PATENT DOCUMENTS

| | | | |
|---|---|---|---|
| 0507389 | 11/1954 | Canada | 192/81 C |
| 0291769 | 4/1914 | Fed. Rep. of Germany | 192/40 |
| 0414006 | 5/1925 | Fed. Rep. of Germany | 192/81 C |
| 0101129 | 6/1982 | Japan | 192/81 C |
| 0167522 | 10/1982 | Japan | 192/84 T |
| 0139788 | 3/1920 | United Kingdom | 192/40 |
| 0597776 | 2/1948 | United Kingdom | 192/81 C |

OTHER PUBLICATIONS

Journal of Engineering for Industry; "On the Continuously Operating Tapered Arbor Spring Slip Clutch", Aug. 1972, pp. 883-889.

Primary Examiner—Rodney H. Bonck
Attorney, Agent, or Firm—Bernard A. Chiama

[57] ABSTRACT

An electromagnetic wrap spring clutch is disclosed as having the clutch energizing electromagnetic coil of a diameter which is smaller than the diameter of the wrap spring clutching coil and located at least partially therein. In this arrangement, the spring coil takes on a relatively large size for more added clutching action relative to the size of the electromagnetic coil.

2 Claims, 4 Drawing Figures

ELECTROMAGNETIC WRAP SPRING CLUTCH

This invention relates to a magnetic spring clutch which has an improved flux path which provides a higher flux density and therefore greater magnetic force for equivalent electrical input.

Conventional magnetic wrap spring clutches normally include a continuously running input member in the form of a hub and a normally stationary, output shaft. When the clutch is activated, the hub is coupled to the output shaft for driving the same. In these clutches, the input hub is axially aligned with the output shaft and a helical spring having one end secured to either the hub or shaft member and has a number of turns of the spring surrounding the other member. When the free end of the spring is activated to tighten on the member it surrounds, a driving connection is imparted to that member. Activation is achieved by means of an electromagnetic coil which is generally arranged to surround the hub and shaft and the coil spring. Upon energization of the coil, an intermediate member which is magnetically actuated by the coil acts upon the spring causing it to tighten on the associated member, usually the output shaft thereby producing the driving connection.

An example of the known art is described in U.S. Pat. No. 3,905,458 which discloses an electromagnetically actuated spring wrap clutch having a coil spring adapted for wrapping around an output member and the field winding for an electromagnetic device surrounding the coil spring. Similarly, in U.S. Pat. No. 3,934,690, an electromagnetic coil of relatively large diameter surrounds the coil spring of relatively small diameter in a wrap spring clutch arrangement Similar arrangements are described in U.S. Pat. Nos. 3,974,902 and 4,030,584. Existing wrap spring clutches have been developed mainly empirically, and without optimization of mechanical components or the magnetic circuits. As a result, these devices are typical of a traditional arrangement of components wherein the electromagnetic coil is of larger diameter than the wrap spring resulting in an inefficient use of electrical power and unnecessary losses of torque produced by the wrap spring.

In the present invention, an electromagnetic wrap spring clutch is arranged such that the electromagnetic coil is within the confines of a wrap spring. In this arrangement, the electromagnetic coil is of small diameter and closely associated with an armature which provides wrap spring tightening upon an output or driven shaft. In addition, the wrap spring coil is of relatively large diameter and is applied to a relatively large diameter driven member connected to the output shaft. With this electromagnetic coil/spring layout, the more desirable ball bearings may be utilized instead of the troublesome sleeve bearings generally provided in conventional clutches of the type described. As a further improvement, the output clutching surface to which the wrap spring coil is releasably held in the transfer of drive, is shaped as a taper. With this form, the application of driving torque may be progressively applied thereby providing a means for controlling torque rise and shape of the force curve affecting the output. A tapered output hub surface is described in the article entitled "On the Continuously Operating Tapered Arbor Spring Slip Clutch", pages 883–889, in the August 1972 issue of the Journal of Engineering for Industry. However, the tapered hub in this description pertains to a slip clutch and not a drive clutch. In the published article, the drive with a spring coil contacting a hub occurs up to a limiting torque. Thereafter, the spring coil slips continuously, thus limiting the torque delivered to the output and allows the input to overdrive. Therefore, the dynamics and use of the respective devices is quite different. These arrangements have these advantages:

(a) the smaller diameter electromagnetic coil provides a higher flux density for the same electrical input, hence greater magnetic force;
(b) the larger diameter spring allows a greater torque input to the spring, hence a greater transmitted torque capability is achieved;
(c) the use of ball bearings at all major load carrying points eliminates wear from the sliding or relative motion experienced by sleeve bearings; and
(d) all thrust loads at the cross-over point are eliminated by means of an air gap at this point thereby eliminating a major source of wear known to degrade clutch performance.

Therefore, it is the principle object of the present invention to utilize components of an electromagnetic wrap spring clutch in their most efficient manner. Still another object of the invention is to improve performance of such clutches to a very high degree not before attained in commercial embodiments. Other objects and advantages will become apparent from the following description taken in conjunction with the accompanying drawings, wherein.

Figure 1:
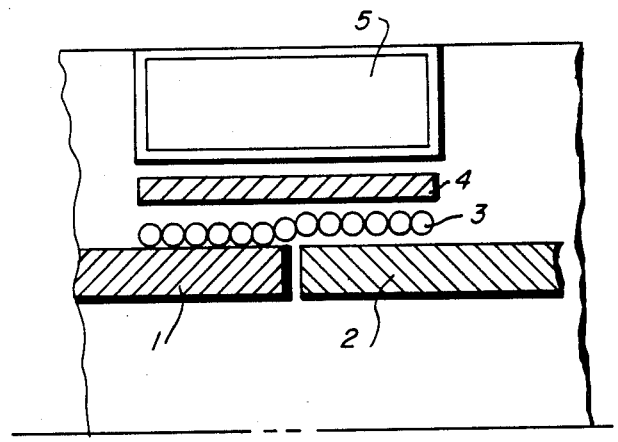
FIG. 1 is a partial schematic illustration of prior art arrangements of an electromagnetic coil in relation to a wrap spring coil.

In the prior art illustration of FIG. 1, the numeral 1 denotes a driving member such as the input hub of a conventional electromagnetic wrap spring clutch, and the numeral 2 denotes the driven member, such as a thimble secured to an output shaft. A wrap spring coil 3 partially encircles the adjacent and nearly abutting ends of the members 1, 2 and has one end secured to the driving member 1 and its other end secured in a control cylinder 4 arranged to encircle both the spring 3 and both members 1, 2.

An electromagnetic coil 5 encircles the members 1, 2, the wrap spring 3 and the control element 4. Upon energization of the coil 5, an armature (not shown), secured to the control element 4, moves the same to the right, as shown in FIG. 1 to cause wrapping of the spring 3 upon the encircled end of the driven member 2. The continuously rotative movement of the driving member 1 is imparted to the driven member 2, as long as the coil 5 is energized. In this arrangement, the diameter of the electromagnetic coil 5 is larger than the structural elements it surrounds and therefore, its lines of flux must necessarily cut across all of these elements for a substantial distance. The electrical input therefore must be maintained at a relatively high level to insure extended operation. Another disadvantage in the prior art arrangement is that the diameter of the wrap spring coil 3 must necessarily be made small. With a relatively small spring being utilized, there is a lessening of the wrap force placed upon the driven member 2. In order to overcome this lack of force so as to insure performance, the spring must be made heavier. However, a heavier spring requires still more electrical input.

Figure 2:
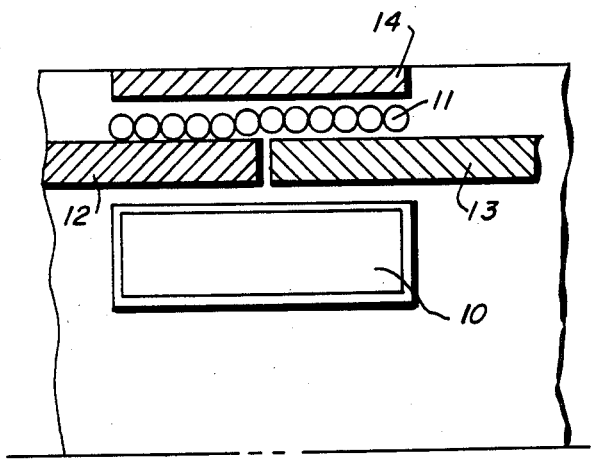
FIG. 2 is a partial schematic illustration of the present invention arrangement of an electromagnetic coil and a wrap spring coil.

The present invention utilizes an arrangement which not only obviates those two problems of the prior art, but also achieves far superior performance and increases the number of operative cycles many fold. As shown in FIG. 2, the arrangement of the present invention uses an electromagnetic coil 10 having a relatively small diameter and a wrap spring coil 11, which encircles the coil 10, of relatively large diameter. A driving member 12 and a driven member 13 operatively associated with the wrap spring also encircles the electromagnetic coil and the control element 14 then becomes the outermost structural element in the clutch.

Figure 3:
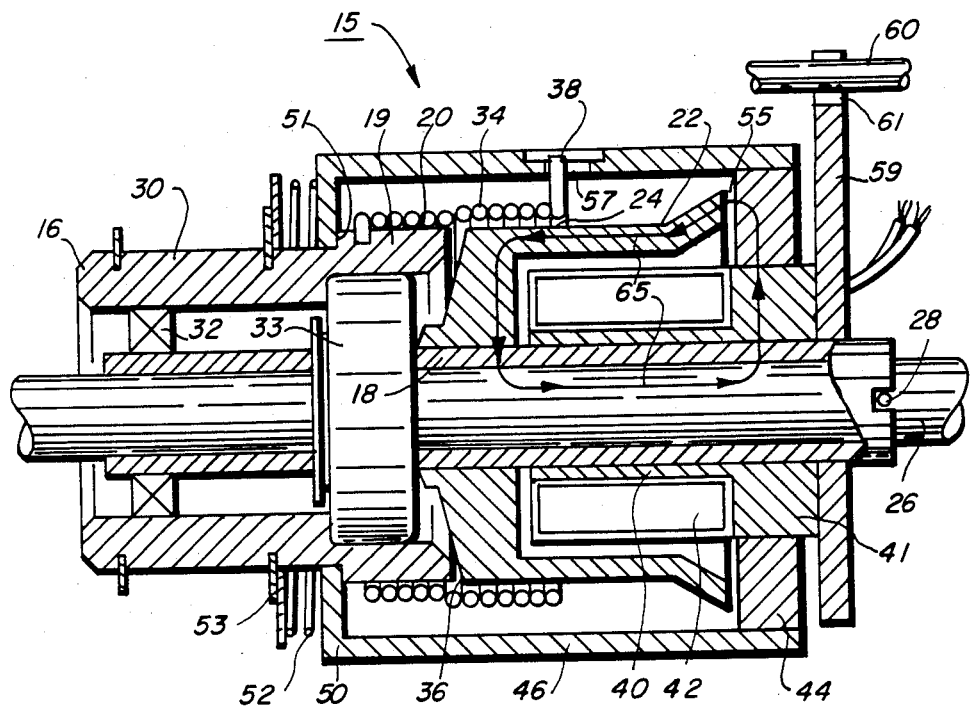
FIG. 3 is a cross-sectional view of the clutch of the present invention.

In a particular embodiment of the present invention, FIG. 3 illustrates an electromagnetic clutch 15 having an input hub assembly 16 and an output shaft hub assembly 18. The input hub 16 includes an enlarged input drum 19 extending inwardly within the clutch body, and being formed with an input clutching surface 20, while the output hub 18 has secured thereto a concentrically arranged output drum 22, being formed with an outer annular output clutching surface 24 which is concentric with the clutching surface 20 and co-planar therewith. As will be described below, rotation is imparted from the input drum 19 to the output drum 22 by means of a clutch spring in the form of a wrap spring coil having a helical configuration.

The hubs 16 and 18 have their axes in coincidence and with the hub 18 being adapted to accommodate an output shaft 26 which may support the clutch 15 in an application thereof. A pin 28 extends transversely of the shaft and has its ends held in notches formed at one end of the hub 18 and thereby provides a rotative connection between the hub 18 and the shaft 26.

The input hub 16 is formed with an outer extension 30 to which a driving pulley (not shown) may be attached. Within the hub 16 and secured thereto are the outer races of inner and outer ball bearings 32, 33, respectively, which serve as the support for the clutch 15 upon the shaft 26. The inner races of the bearings 32, 33 are fixed to the output shaft hub 18 and thereby provide a two point bearing support for the clutch 15 upon the hub 18.

As previously stated, the hub assembly 18 encircles the shaft 26 and is cylindrical in form. The hub supports concentrically the output drum 22 for rotation therewith, with the clutching surface 24 having generally the same diameter as the surface 20 on the drum 19 of the input hub 16. A wrap spring coil 34 encircles both of the surfaces 20, 24 on the adjacent ends of the input drum 19 and the output drum 22, the ends being separated by a space 36 which will designate the crossover point for the wrap spring clutch. Approximately one-half of the turns of the spring coil 34 operate upon each of the surfaces 20, 24, one end of the spring being anchored on the drum 19, while the other end is formed in a tang 38. As is well known in the art, the direction of the helix of the wrap spring 34 is such that rotation of the input drum 19 has, through frictional engagement with the clutching surface 24, the effect of contracting the coils of the spring 34 so that the coils tightly grips the clutching surfaces 20, 24 and thereby transmit rotation from the input hub 16 to the output hub 18.

Encircling the output shaft hub 18 and supporting the same is a coil housing in the form of sleeve member 40 having an enlarged end section 41 which is held against rotation as will be described below. The sleeve member provides a bearing surface for the shaft hub 18 and a suitable lubricant may be applied between their coacting surfaces. An electromagnetic coil 42 is supported concentrically on the member 40 and is held against rotation therewith preferably as by a tight fit. As shown in FIG. 3, the coil 42 extends within the drum 22 and has a portion surrounded by the clutching surface 24. The coil 42 cooperates with an armature 44 which concentrically encircles the end section 41 of the member 40 and has an outer diameter extending to and slightly beyond the outer diameter of the drum 22. A control collar 46, being coaxial with the shaft hub 18, surrounds the coil spring 34, the drum 22, the coil 42 and the member 40 and serves to control the wrap of the spring coil 34 upon the clutching surfaces 20, 24.

The collar 46 is formed at one end with an internal flange 50 surrounding the outer extension 30 of the input hub 16 and being held against a shoulder 51 formed on the hub so as to be rotatable therewith. A coil spring 52 held in compression between the flange 50 and a lock ring 53 serves to maintain the control collar against the shoulder 51 when the electromagnetic coil 42 is deenergized.

At the other end of the collar 46 and closing the same, is the ring-shaped armature 44 being rotatable and having a slidable engagement with the inner surface of the control collar 46. During rotation of the collar 46, the armature 40 is arranged to rotate with the collar but is permitted to slide axially therein. When the clutch 15 is in its operative condition, that is, the coil 42 is deenergized, a gap or separation 55 is provided between the armature 44 and the adjacent end of the drum 22. This gap closes when the coil 42 is energized to effect a frictional drive engagement between the armature and the drum, as will be described below.

In order to impart wrap spring motion to the drum 22, the tang 38 for the wrap spring coil 34 is anchored to the control collar 46. Actually, the tang extends through a small axial slot 57 formed in the collar so as to permit slight movement or clearance between these parts. To complete the structure of the clutch 15, an anti-rotation member 59 is secured to the end section 41 of the coil housing 40 and is held against rotation by means of a rod 60 secured to the machine structure to which the clutch is applied. The rod 60 is slidably received in a suitable slot 61 formed in the member 60 to hold the same against rotation but permit sliding of the clutch therealong. A suitable opening is formed in the member 59 and the coil housing 40 to permit the passage of electrical wires to the coil 42.

In operation, the structural parts of the clutch 15 when the same is in its deenergized state is as shown in FIG. 3. In this state, the input hub 16 is rotating continuously imparting corresponding rotation to the wrap spring coil 34, the control collar 46, and the armature 44. In this state, the output shaft hub 18 and the output drum 22 are not rotating, thus preventing the output shaft 26 from rotating. To energize the clutch 15 to thereby impart rotation to the shaft 26, an external electrical signal must be generated to energize the electromagnetic coil 42. Upon this occurrence, flux lines will be produced by the coil 42 in the path illustrated by the line of arrows 65 extending through the armature 44. The flux lines so produced have a path which includes the walls of the drum 22, the section 41 for the coil housing and the armature 44 thereby constituting a relatively short path.

This energization causes the armature 44 to be moved to the left as viewed in FIG. 3 whereby effecting corresponding movement to the control collar 46 against the bias of the spring 52. The slot 57 permits the slight movement of the collar relative to the tang 38. Such action on the collar 46 closes the gap 55 between the armature 44 and the adjacent end of the output drum 22 thereby establishing frictional contact between these structural parts. This contact commences a slight dragging effect upon the collar 46 causing the same to be driven slower than the input hub 16, without imparting rotative movement to the drum 22. The relative motion between the collar 46 and the hub 16 produces the wrapping of the section of the coil 34 surrounding the drum 22 upon the bearing surface 24 thereon thereby imparting drive to the output drum 22 from the driving action of the input hub 16. This driving action, in turn, produces the desired driving action upon the output shaft 26.

It will be appreciated when viewing FIG. 3 taken in conjunction with the above description that the electromagnetic coil 42 has a diameter smaller than that of the wrap spring coil 34. This arrangement provides a relatively larger spring coil which may be utilized for use in a clutch of this type and thereby is adapted to transmit greater torque to a driven member. In addition, all thrust loads at the crossover point 36 are eliminated by means of the air gap between the hub extension 19 and the adjacent end of the output drum 22. The arrangement also results in use of an electromagnetic oil which is smaller than the requirements of the conventional clutch for the necessary output results.

Figure 4:
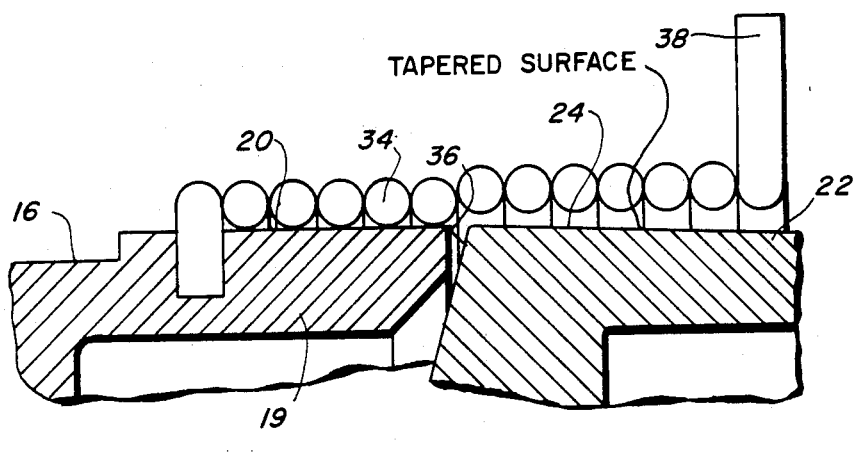
FIG. 4 is a fragmentary view, in cross-section, of a detail of the present invention.

Another feature of the described clutch is the formation of a tapering clutch surface on the output side thereof. As shown in FIG. 4, the output clutching surface 24 on the output drum 22 is tapered toward the axis thereof in a direction extending away from the drum 19 which is in the direction as the coils of the clutching spring 34 are applied. Normally, the coils of a wrap spring become frictionally applied almost simultaneously to a surface during energization of the associated electromagnetic coil. Such near immediate clutching action causes an instantaneous torque buildup thus limiting the inertial load capability of the clutch.

In the present arrangement, tapering of the surface 24 causes a sequential wrapping of the spring coils 34, and a predictable torque rise, allowing for greater inertial loading, or conversely, limiting the torque spike on start up. In this manner, torque may be controlled for its specific application by employing proper taper angles, or even curvature which also may be formed on the drum 22. Such torque handling has the effect of extending the life of the clutch and improving reliability to a very great extent.

While the invention has been described with reference to the structure disclosed, it is not confined to the details set forth, but is intended to cover such modifications or changes as may come within the scope of the following claims.

We claim:

1. In an electromagnetically actuated wrap spring clutch having a cylindrical input clutching surface, an output clutching surface, a helical spring surrounding the surfaces and having one end secured to the input surface to rotate therewith, said input surface being adapted to impart rotation to the output clutching surface by virtue of frictional engagement of the spring upon the output surface, and an electromagnetic coil being coaxial with the surfaces and the spring for selectively causing the frictional engagement, the improvement including:

a cylindrical control member surrounding the clutching surfaces and arranged to impart contracting of the helical spring when actuated for wrapping the same upon the output clutch surface, an armature operatively associated with said control member, said electromagnetic coil when energized produces a magnetic flux path which passes through said armature to cause the same to actuate said control member and thereby provide a driving connection between the input and output clutching surfaces, said electromagnetic coil having a diameter less than the diameter of the helical spring and the output clutching surface.

2. The clutch claimed in claim 1 wherein said output clutch surface is tapered toward the axis of said surfaces in a direction extending away from said input surface.

* * * * *